United States Patent
Takeuchi et al.

(10) Patent No.: US 7,274,165 B2
(45) Date of Patent: Sep. 25, 2007

(54) NUMERICAL CONTROLLER

(75) Inventors: Yasushi Takeuchi, Hino (JP); Takahiko Endo, Kokubunji (JP)

(73) Assignee: FANUC Ltd, Yamanashi (JP)

( * ) Notice: Subject to any disclaimer, the term of this patent is extended or adjusted under 35 U.S.C. 154(b) by 0 days.

(21) Appl. No.: 11/410,289

(22) Filed: Apr. 25, 2006

(65) Prior Publication Data

US 2006/0255759 A1    Nov. 16, 2006

(30) Foreign Application Priority Data

Apr. 25, 2005    (JP)    ............ 2005-126098

(51) Int. Cl.
G05B 19/10    (2006.01)

(52) U.S. Cl. ............ 318/567; 318/569; 318/573; 318/600

(58) Field of Classification Search ............ 318/560, 318/567, 568.1, 568.15, 568.22, 569, 573, 318/600
See application file for complete search history.

(56) References Cited

U.S. PATENT DOCUMENTS

| | | | |
|---|---|---|---|
| 4,095,158 A | * | 6/1978 | Matsumoto ............ 318/603 |
| 5,019,763 A | * | 5/1991 | Komatsu ............ 318/571 |
| 5,153,490 A | * | 10/1992 | Ueta et al. ............ 318/571 |
| 5,708,586 A | | 1/1998 | Ikeda et al. |
| 5,919,380 A | | 7/1999 | Magara et al. |
| 6,757,581 B2 | * | 6/2004 | Fujishima et al. ............ 700/176 |
| 6,885,909 B2 | | 4/2005 | Isohata |

FOREIGN PATENT DOCUMENTS

| | | |
|---|---|---|
| JP | 59-177604 | 10/1984 |
| JP | 2003-303005 | 10/2003 |

* cited by examiner

Primary Examiner—Rina Duda
(74) Attorney, Agent, or Firm—Staas & Halsey LLP

(57) ABSTRACT

A numerical controller capable of mitigating mechanical shock caused by tool compensation while a machine tool is operated according to table data. X- and Z-axis path tables Tx, Tz store X- and Z-axis positions corresponding to reference positions (time or spindle position). A tool compensation table Tt stores X- and Z-axis compensation amounts (tool compensation numbers) associated with the respective reference positions. At every predetermined period, X- and Z-axis path table interpolators read command positions from the path tables Tx, Tz based on the reference position, and obtain command motion amounts by interpolation. X- and Z-axis tool interpolators read compensation amounts from the tool compensation table Tt based on the reference position, and obtain compensation motion amounts by interpolation. Adders add up the command motion amounts and the respective compensation motion amounts to drive respective motors. The tool compensation amounts are gradually varied, whereby mechanical shock does not occur.

8 Claims, 11 Drawing Sheets

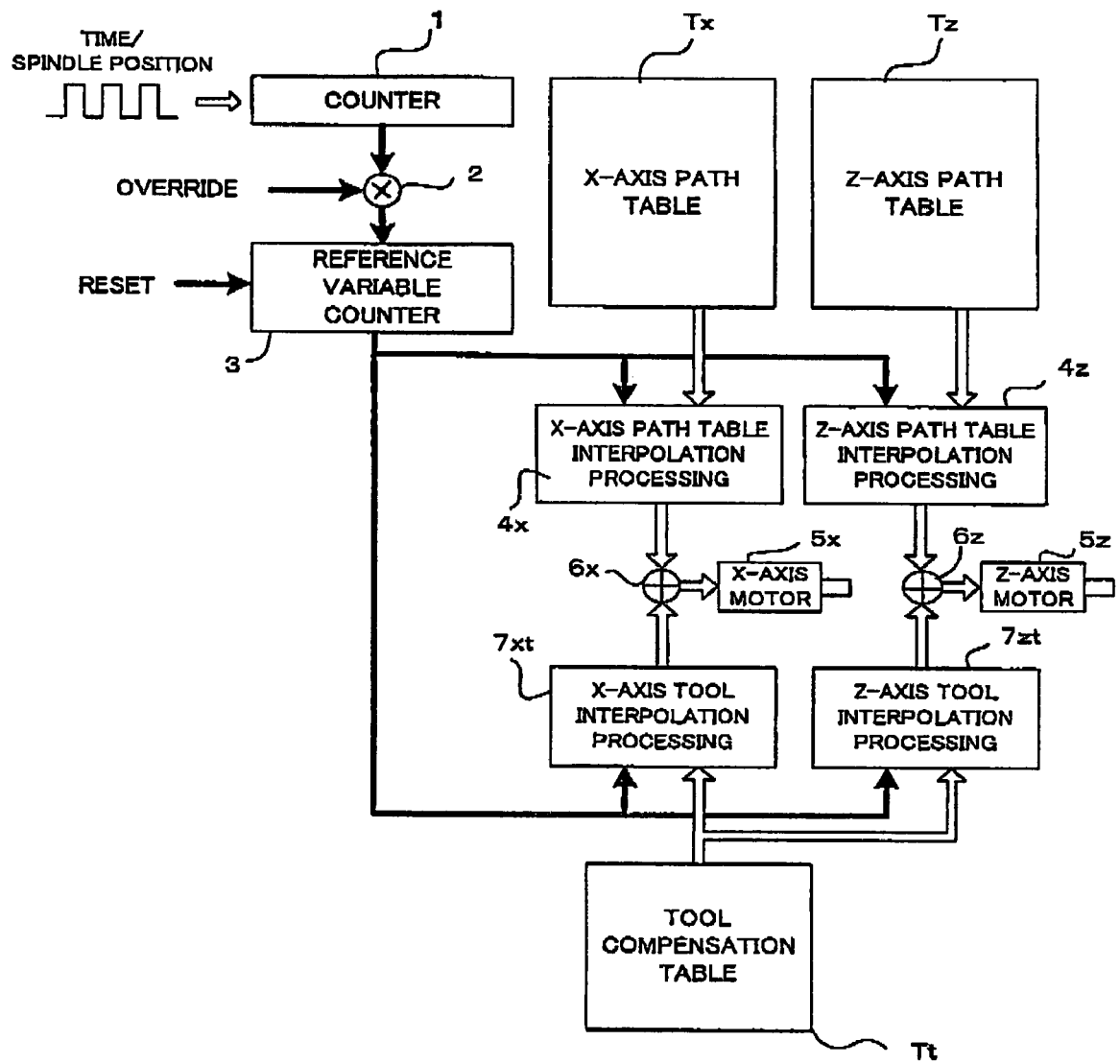

| TOOL COMPENSATION NUMBER Tcmd | X-AXIS COMPENSATION AMOUNT XOFScmd | Z-AXIS COMPENSATION AMOUNT ZOFScmd |
|---|---|---|
| T1 | XOFS1 | ZOFS1 |
| T2 | XOFS2 | ZOFS2 |
| T3 | XOFS3 | ZOFS3 |
| T4 | XOFS4 | ZOFS4 |
| T5 | XOFS5 | ZOFS5 |

TOFS

FIG.13
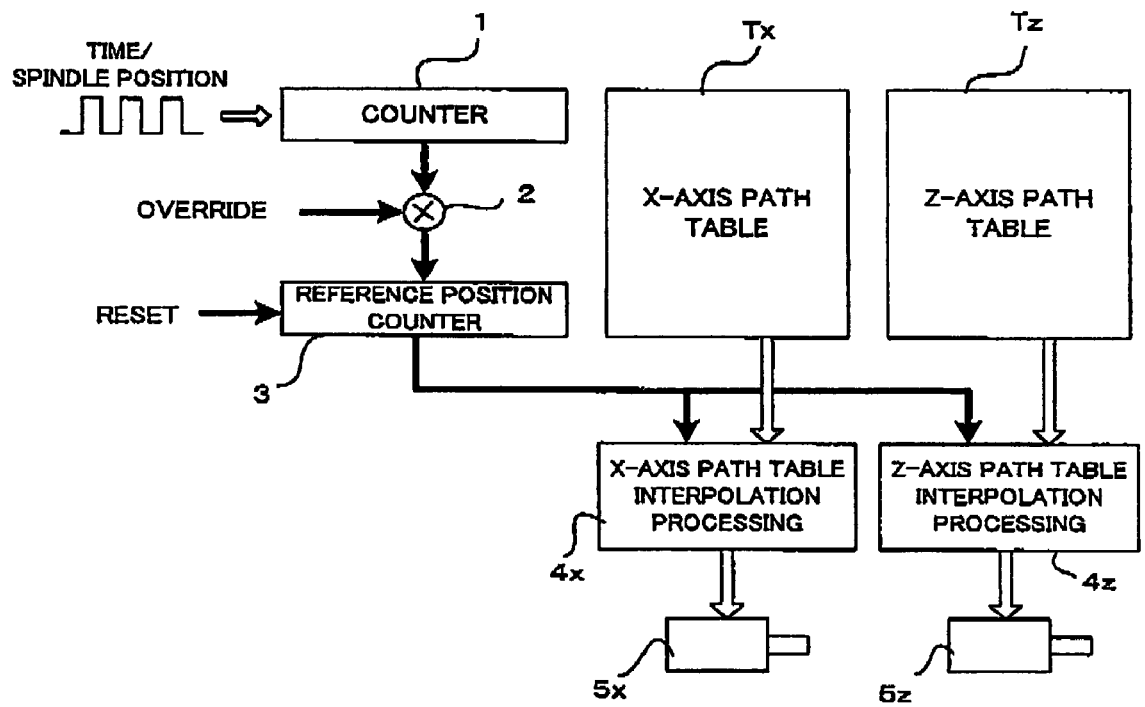
FIG.14
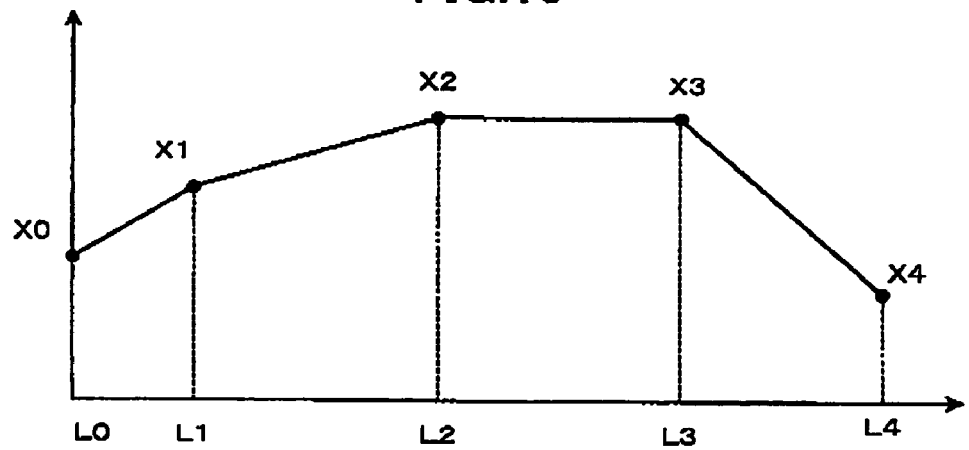
FIG.15

US 7,274,165 B2

NUMERICAL CONTROLLER

BACKGROUND OF THE INVENTION

1. Field of the Invention

The present invention relates to numerical controllers for controlling machine tools, and more particularly, to a numerical controller for controlling the operation of individual axes of a machine tool in accordance with data stored in the form of tables.

2. Description of Related Art

In some conventional numerical controllers known in the art, the operation of individual axes of a machine tool is controlled not by block commands of an NC program, but in accordance with data stored in the form of tables in which amounts of travel and positions of the axes are set beforehand. With such numerical controllers, the tool can be made to move freely without the restraints of block commands conventionally used, thereby shortening the machining time and achieving high-precision machining.

For example, a numerical control technique is known in which positions of movable axes relative to time or rotational angle are stored as numerical control data, the time or the rotational angle is monitored, and each time the stored time or rotational angle is reached, corresponding numerical control data of the movable axes is outputted (cf. JP 59-177604A).

There has also been known a numerical controller which is provided with data tables storing command positions for X and Z axes relative to a reference position, and in which the reference position is obtained by multiplying the value of a counter for counting reference pulses by an override value, and based on the obtained reference position, X- and Z-axis command positions stored in the data tables are outputted to perform synchronization control of the X and Z axes. With this numerical controller, override can be applied even while the operation is controlled in accordance with the data stored in the data tables. Further, it is possible to instruct whether the command positions are to be connected by using a linear function, a quadratic function or a cubic function, as well as to command an auxiliary function (cf. JP 2003-303005A).

FIGS. 13 to 15 schematically illustrate the operation according to table data, disclosed in JP 2003-303005A.

In the example shown in FIG. 13, an X-axis path table Tx and a Z-axis path table Tz are provided. FIG. 14 exemplifies the X-axis path table Tx in which are stored positions for the X axis relative to a reference position. FIG. 15 is a graph showing the positions of the X axis moved in accordance with the X-axis path table Tx shown in FIG. 14.

The Z-axis path table Tz similarly stores positions for the Z axis relative to the reference position. Pulses (spindle position) from a position coder provided at the spindle or time-based pulses from an external pulse generator are inputted to a counter 1 and counted thereby. A multiplier 2 multiplies the count of the counter 1 by an override value set in override means, and the result is inputted to a reference position counter 3. The reference position counter 3 is reset when path table operation function is commanded The value of the reference position counter 3 is inputted, as the reference position, to X- and Z-axis path table interpolators 4x and 4z. The X- and Z-axis path table interpolators 4x and 4z look up the respective X- and Z-axis path tables Tx and Tz to obtain X- and Z-axis command positions relative to the reference position, then obtain respective amounts of travel for the processing period, and output the obtained motion amounts as commands to respective control axis motors 5x and 5z to synchronously operate the X and Z axes in accordance with the reference position.

In machine tools, the machining path needs to be corrected so as to compensate for wear or mounting error of the tool, and usually, tool compensation is performed for the purpose. Such tool compensation is carried out also in the case of the aforementioned table data-based operation (hereinafter referred to as path table operation). Specifically, in JP 2003-303005A mentioned above, a tool compensation table storing tool compensation numbers to be commanded on the basis of the spindle position or time is prepared for each axis, and based on the table, the difference between a compensation amount corresponding to the offset number and the previous compensation amount is outputted to the corresponding axis at the commanded spindle position or reference time. FIG. 16 illustrates the tool compensation for the X-axis disclosed in JP 2003-303005A. Each compensation table stores tool compensation numbers in association with the spindle position or time on the basis of which the tool compensation is performed, tool compensation amounts for the corresponding axis are obtained based on the tool compensation numbers, and at the commanded spindle position or time, the difference between the tool compensation amounts is outputted in one lump. No problem arises if the difference between the tool compensation amounts is small. If the difference between the compensation amounts is large, however, a large offset is outputted at a time, with the result that the tool velocity suddenly changes at the commanded position, possibly exerting an adverse influence on the machining because of mechanical shock or the like.

SUMMARY OF THE INVENTION

The present invention provides a numerical controller capable of mitigating mechanical shock attributable to tool compensation during the path table operation.

A numerical controller of the present invention controls motors for driving axes of a machine tool according to a data table for commanding positions of the axes on the basis of time or a spindle position (spindle denotes an axis which rotates in one direction) as a reference variable. According to one aspect of the present invention, the numerical controller comprises: storage means storing tool-compensation numbers respectively set for command values of the reference variable at which tool-compensations are to be effected, and storing tool-compensation amounts respectively set for the tool compensation numbers; and interpolation means for interpolating the tool-compensation amount for each of the command values of the reference variable stored in the storage means with a set compensation velocity at every predetermined period, and outputting interpolated tool-compensation amounts to the motors.

According to another aspect of the present invention, the numerical controller comprises: storage means storing tool-compensation numbers respectively set for command values of the reference variable at which tool-compensations are to be effected, commanded tool-compensation amounts respectively set for the tool-compensation numbers, and a set tool-compensation velocity; calculation means for calculating a difference between the commanded tool-compensation amount for the tool-compensation number set for a next command value of the reference variable that is closest to and greater than a present value of the reference variable and the commanded tool-compensation amount for the tool-compensation number set for the previous command value of the reference variable; and output means for outputting a tool-compensation amount to vary by the difference of the commanded tool-compensation amounts calculated by the calculation means with the set compensation velocity such that variation of the tool-compensation amount is started at the next command value of the reference variable or to be completed at the next command value of the reference variable.

The storage means may store property information about each of the command values of the reference variable at which the tool-compensation is to be started or completed.

According to still another aspect of the present invention, the numerical controller comprises: first storage means storing tool-compensation numbers respectively set for command values of the reference variable at which tool-compensations are to be started, and tool-compensation numbers respectively set for command values of the reference variable at which the tool-compensations are to be terminated; second storage means storing commanded tool-compensation amounts respectively set for the tool compensation numbers; and output means for outputting a tool-compensation amount to be gradually varied between adjacent ones of the commanded tool-compensation amounts while the reference variable changes from each one of the command values at which the tool-compensations are to be started to adjacent one of the command values at which the tool-compensations are to be terminated.

The numerical controller may further comprise means for adjusting the tool-compensation amount such that a motion mount of each of the axes compensated by the tool-compensation amount does not exceed a set limit value.

According to the present invention, since the tool compensation amount is gradually varied, mechanical shock attributable to the tool compensation does not occur.

BRIEF DESCRIPTION OF THE DRAWINGS

FIG. 1 schematically illustrates the function of table data-based operation performed by embodiments of the present invention;

FIG. 2 illustrates an example of a tool compensation table according to a first embodiment of the present invention;

FIG. 13 schematically illustrates the function of conventional table data-based operation;

FIG. 14 illustrates an example of an X-axis path table used in the conventional table data-based operation;

FIG. 15 illustrates X-axis movement according to the conventional table data-based operation.

DETAILED DESCRIPTION

FIG. 1 schematically illustrates the function of table data-based operation performed by embodiments of the present invention. The illustrated function differs from the conventional one shown in FIG. 13 in that it is provided with a tool compensation table Tt, X- and Z-axis tool compensation interpolators $7xt$ and $7zt$, and adders $6x$ and $6z$.

Pulses from a position encoder provided at a spindle of a machine tool indicating a spindle position, or pulses from an external pulse generator representing time are inputted to the counter 1 and counted thereby. Thus, a value of a reference variable such as the spindle position or time is stored in the counter 1. The spindle position may alternatively be counted based on command values for the spindle.

The multiplier 2 multiplies the count of the counter 1 by a multiplication factor set in override means, and the result is added to the count of the reference variable counter 3. The reference variable counter 3 is reset when the path table operation function is commanded. The value of the reference variable counter 3 is inputted to the X- and Z-axis path table operation interpolators $4x$ and $4z$ and the tool compensation interpolators $7xt$ and $7zt$. The X- and Z-axis path table operation interpolators $4x$ and $4z$ look up the respective X- and Z-axis path tables Tx and Tz to obtain X- and Z-axis command positions relative to the reference position, and derive respective amounts of travel for the processing period. The processing explained so far is identical with the conventional path table operation, and the embodiments differ from the conventional device in that the move commands for each processing period, obtained by the X- and Z-axis path table operation interpolators $4x$ and $4z$, are outputted to the adders $6x$ and $6z$, respectively.

Also, in each processing period, the tool compensation interpolators $7xt$ and $7zt$ refer to the tool compensation table Tt and interpolate tool compensation amounts, and output the obtained compensation motion amounts to the adders $6x$ and $6z$, respectively. The adders $6x$ and $6z$ sum up the command motion amounts outputted from the X- and Z-axis path table operation interpolators $4x$ and $4z$ and the respective compensation motion amounts from the tool compensation interpolators $7xt$ and $7zt$, and output the results to the control axis motors $5x$ and $5z$, respectively. The present invention is characterized in that the commanded motion amounts and the respective tool-compensation motion amounts are added together and that the sums are outputted to the respective control axis motors $5x$ and $5z$.

In the following description, the spindle position is used as the reference variable and thus command value of the reference variable is referred to as command reference position.

Figures 3, 4:
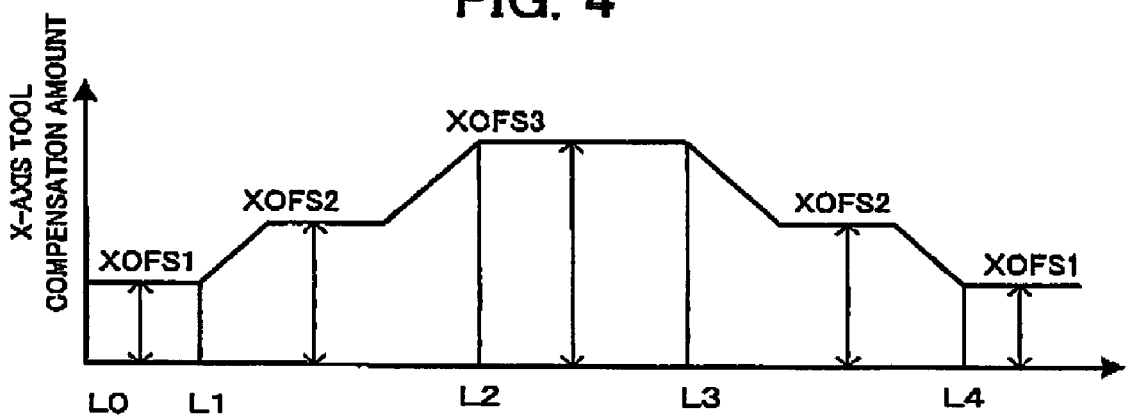
FIG. 3 illustrates an example of a compensation amount table used in the embodiments of the present invention.
FIG. 4 illustrates X-axis movement according to tool compensation of the first embodiment.

FIG. 2 illustrates an example of the tool compensation table Tt. As illustrated, a tool compensation number Tcmd and property information Mcmd are set and stored in association with each command reference position Lcmd on the basis of which tool compensation is performed. The command reference position Lcmd corresponds to the reference position Lcur, which is the output of the reference variable counter 3. Further, a compensation amount table TOFS, shown in FIG. 3, is provided which stores X- and Z-axis compensation amounts XOFScmd and ZOFScmd in association with the respective tool compensation numbers Tcmd. Namely, with respect to each tool compensation number Tcmd, the corresponding X- and Z-axis compensation amounts XOFScmd and ZOFScmd are stored.

According to this embodiment, the tool compensation amounts corresponding to the command reference position are obtained using the tool compensation table Tt and the compensation amount table TOFS, and are interpolated by means of a command compensation velocity, and the results obtained are superposed on the respective command motion amounts for the path table operation, to drive the respective axis motors $5x$ and $5z$.

FIG. 4 illustrates X-axis tool compensation according to the first embodiment, which is based on the tables Tt and TOFS shown in FIGS. 2 and 3. In the tool compensation table Tt shown in FIG. 2, the property information "1" is an instruction that the tool compensation should be completed at the corresponding command reference position Lcmd, and the property information "0" is an instruction that the tool compensation should be started at the corresponding command reference position Lcmd.

For the command reference position L0, "1" is set as the property information, which means that the tool compensation is already completed (the tool compensation is completed during machining or the like preceding the path table operation). Specifically, the X-axis compensation amount XOFScmd corresponding to the tool compensation number T1 specified by the command reference position L0 is "XOFS1", as seen from the compensation amount table TOFS shown in FIG. 3, and the tool compensation based on the X-axis compensation amount XOFS1 is already completed at the command reference position L0. For the next command reference position L1, "0" is set as the property information Mcmd, and accordingly, when the reference position Lcur reaches the command reference position L1, the X-axis compensation amount XOFS2, which corresponds to the tool compensation number T2 specified by the command reference position L1, starts to be interpolated by means of the set compensation velocity. Further, with respect to the next command reference position L2, "1" is set as the property information. Thus, immediately before the reference position Lcur reaches the command reference position L2, the interpolation is started so that the tool compensation based on the X-axis compensation amount XOFS3 corresponding to the specified tool compensation number T3 may be completed when the command reference position L2 is reached. This applies to the Z axis as well.

As stated above, in the first embodiment, the tool compensation amounts are interpolated by means of the set compensation velocity so that the tool compensation may be completed within multiple processing periods, whereby mechanical shock attributable to the tool compensation can be prevented.

Figure 5:
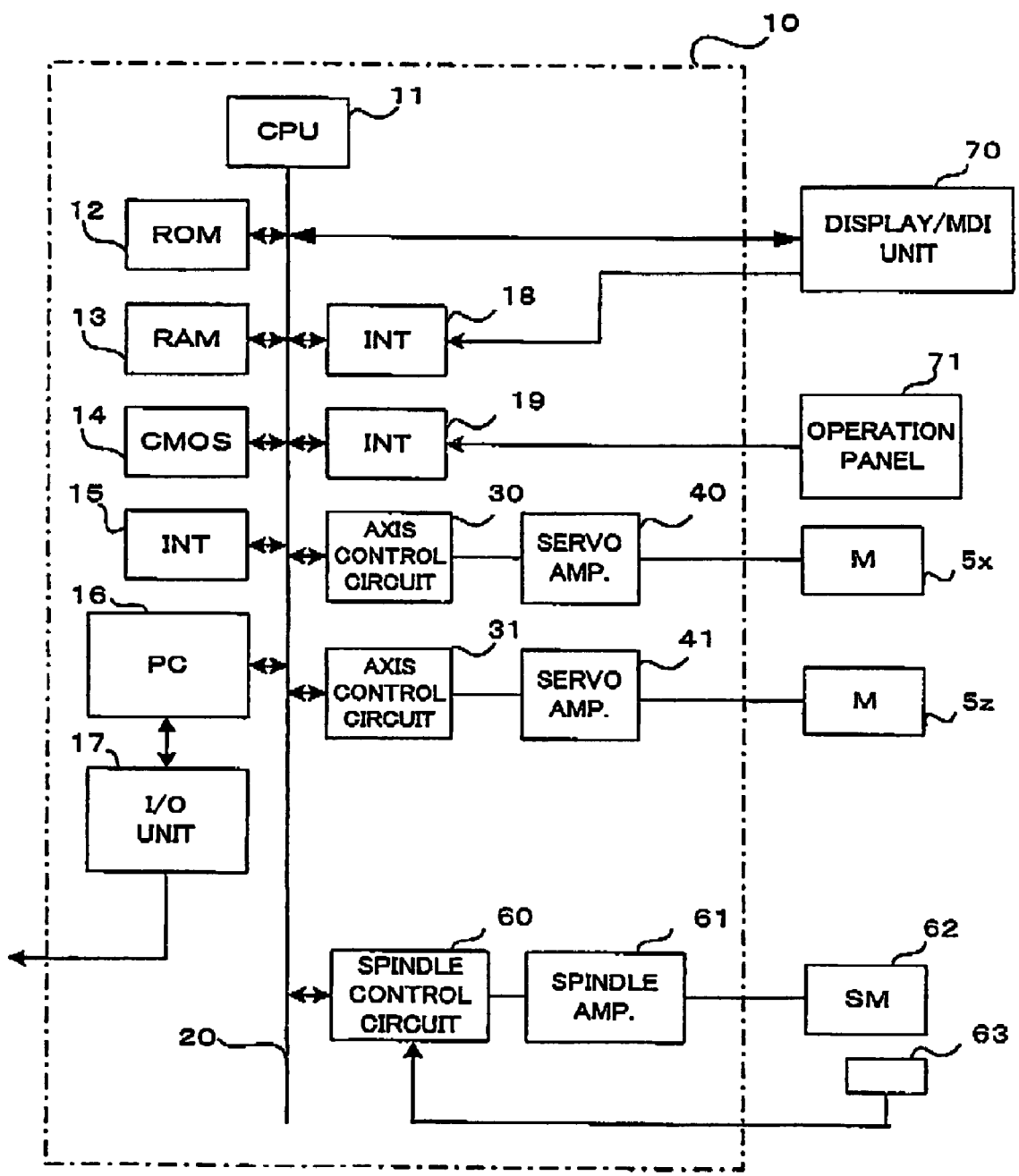
FIG. 5 is a block diagram showing a principal part of a numerical controller of the first and second embodiments of the present invention.

FIG. 5 is a block diagram showing a principal part of a numerical controller 10 used in the embodiments of the present invention, whereby a machine tool is operated in the path table operation mode. A CPU 11 is a processor for globally controlling the numerical controller 10. The CPU 11 reads out, via a bus 20, a system program stored in a ROM 12, and controls the whole numerical controller in accordance with the system program. A RAM 13 temporarily stores calculation data and display data, as well as various data inputted by the operator through a display/MDI unit 70. A CMOS memory 14 comprises a nonvolatile memory which is backed by a battery, not shown, and thus can retain the contents stored therein even if the power supply to the numerical controller 10 is cut off. The CMOS memory 14 stores machining programs read in via an interface 15 as well as machining programs inputted via the display/MDI unit 70. Further, the aforementioned X- and Z-axis path tables Tx and Tz, tool compensation table Tt and compensation amount table TOFS are previously stored in the CMOS memory 14.

The interface 15 permits an external device to be connected to the numerical controller 10. A PC (Programmable Controller) 16 outputs signals to auxiliary devices of the machine tool via an I/O unit 17 in accordance with a built-in sequence program of the numerical controller 10, to control the auxiliary devices. Also, the PMC is supplied with signals from various switches etc. of an operation panel provided on the body of the machine tool, performs necessary processing on the signals, and transfers the processed signals to the CPU 11.

The display/MDI unit 70 is a manual data input device provided with a display such as a CRT or liquid crystal display, a keyboard, etc. An interface 18 transfers commands and data, inputted through the keyboard of the display/MDI unit 70, to the CPU 11. An interface 19 is connected to an operation panel 71 to receive various commands therefrom.

Axis control circuits 30 and 31 receive move commands for respective axes from the CPU 11 and output the commands to respective servo amplifiers 40 and 41. On receiving the commands, the servo amplifiers 40 and 41 drive servomotors $5x$ and $5z$ associated with the respective axes. Each servomotor $5x$, $5z$ has built-in position and velocity detectors, and position and velocity feedback signals from the position and velocity detectors are fed back to the axis control circuit 30, 31 to perform position/velocity feedback control. In FIG. 5, the elements related with the position/velocity feedback control are omitted.

A spindle control circuit 60 is supplied with a spindle rotation command and outputs a spindle velocity signal to a spindle amplifier 61. On receiving the spindle velocity signal, the spindle amplifier 61 causes a spindle motor 62 for rotating the spindle to rotate at the commanded velocity. A position coder 63 feeds a feedback pulse (reference pulse) and a single-rotation signal back to the spindle control circuit 60 in synchronism with rotation of the spindle, to perform velocity control. The feedback pulse and the single-rotation signal are read by the CPU 11 through the spindle control circuit 60, and the feedback pulse (reference pulse) is counted by a counter (counter 1 in FIG. 1) provided in the RAM 13. A command pulse for the spindle may alternatively be used as the reference pulse.

Figure 6:
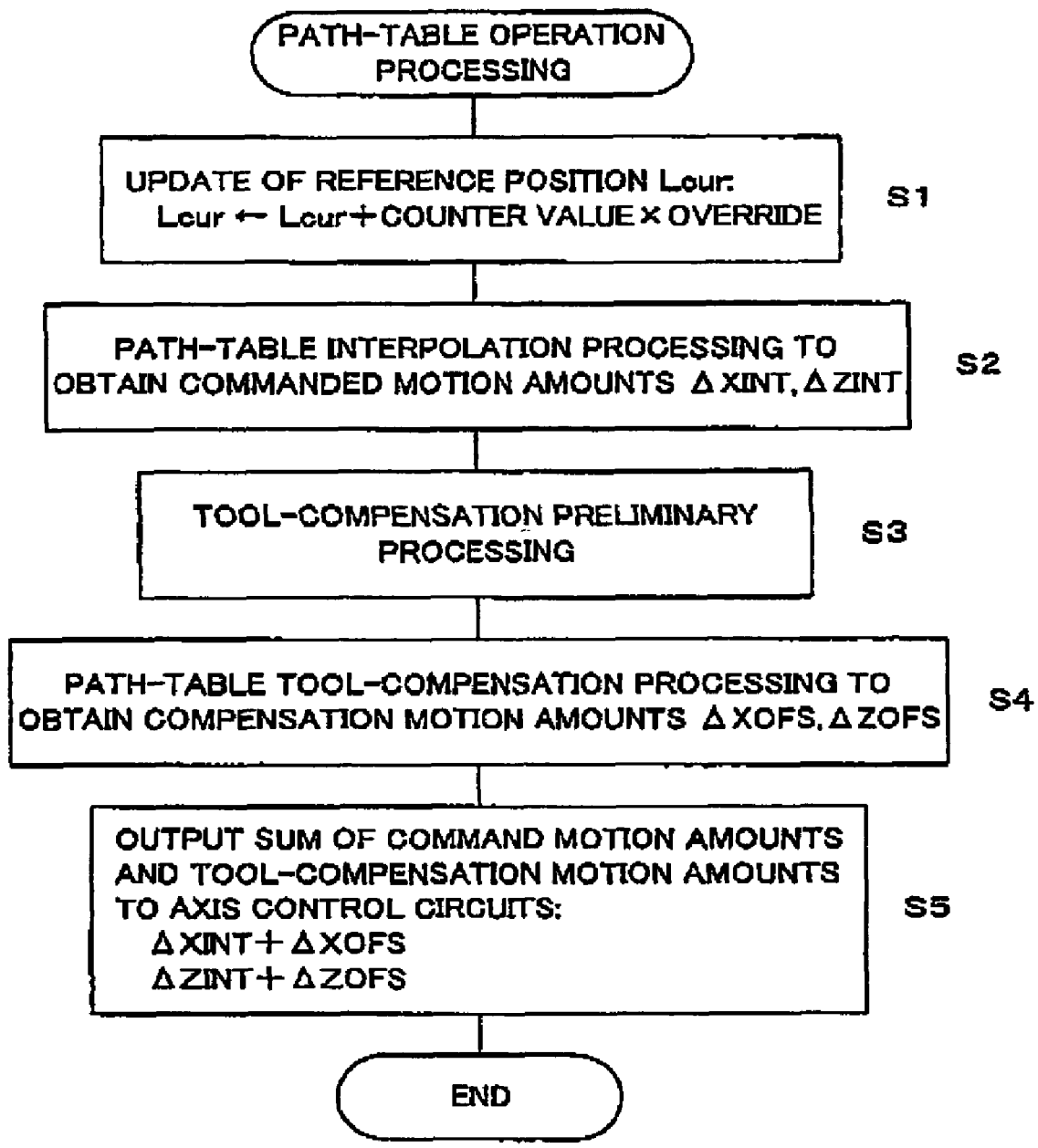
FIG. 6 is a flowchart illustrating a process for path table operation performed in the embodiments of the present invention.
Figure 7:
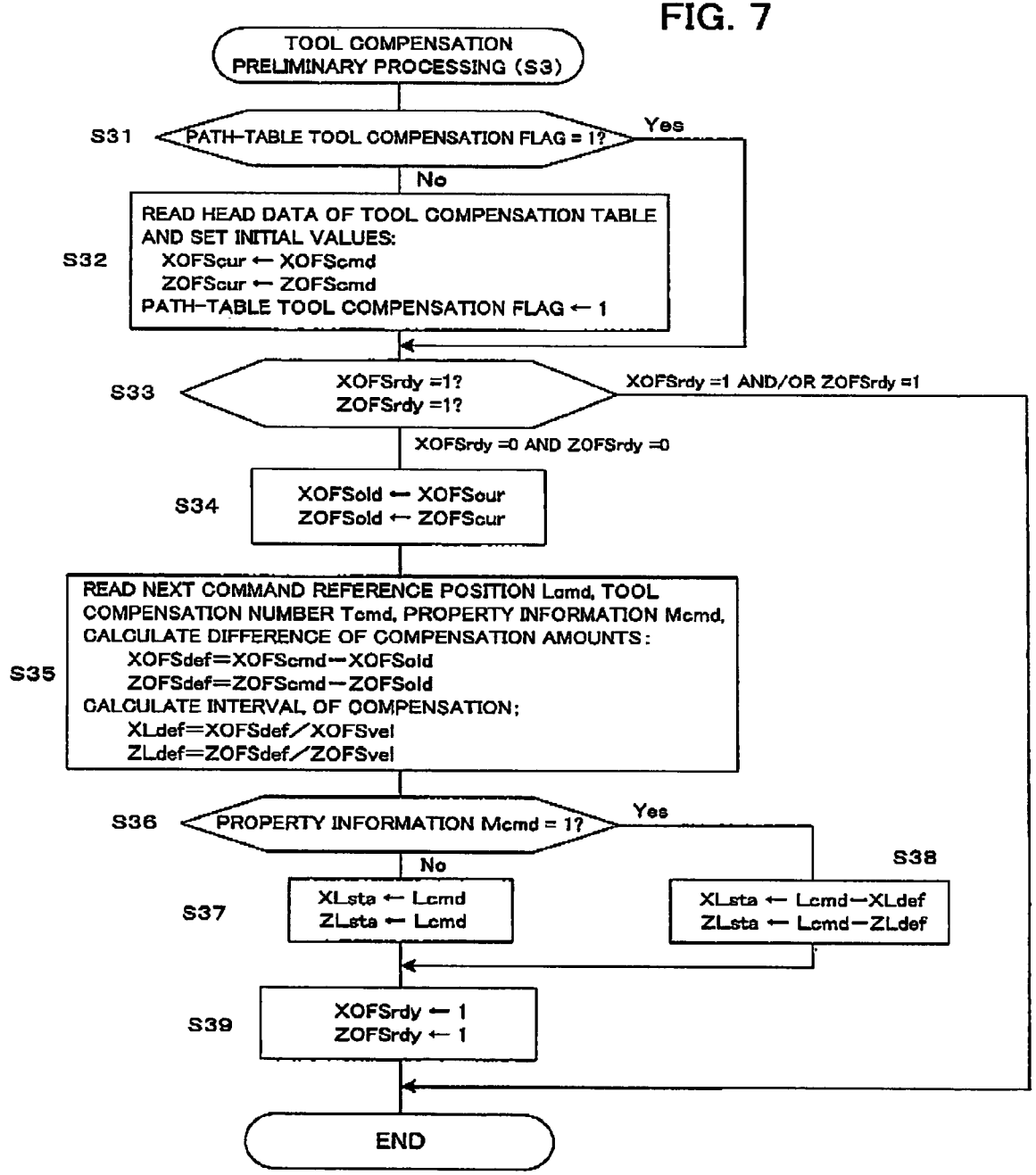
FIG. 7 is a flowchart illustrating a tool compensation table read process according to the first embodiment of the present invention.
Figure 8:
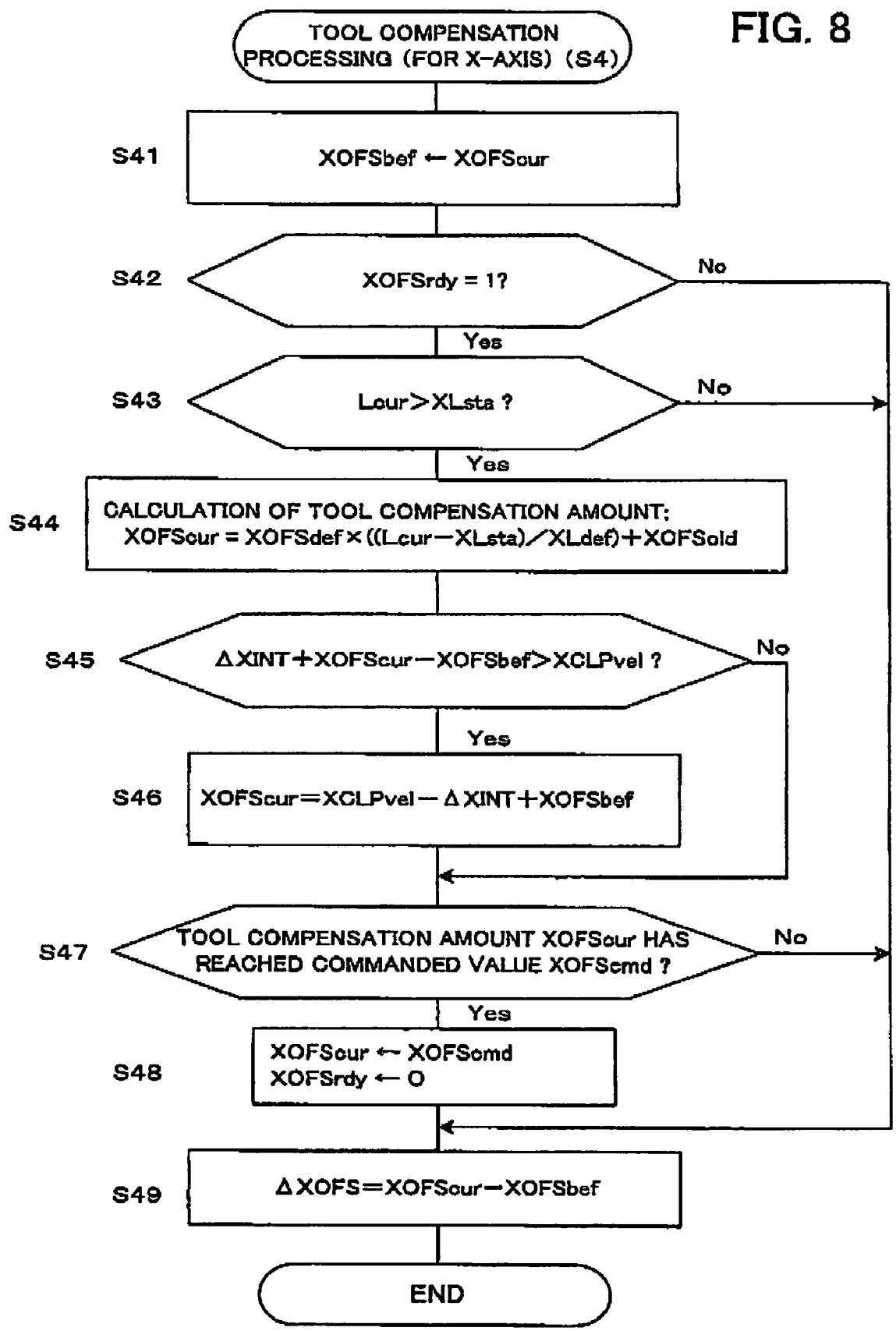
FIG. 8 is a flowchart illustrating a tool compensation process according to the first embodiment of the present invention.

FIGS. 6 to 8 are flowcharts illustrating the algorithms of processes executed by the CPU 11 of the numerical controller during the path table operation according to the first embodiment.

The CPU 11 of the numerical controller executes the processing shown in FIG. 6 at every predetermined period.

First, the reference position Lcur is updated (corresponding to the processing of the reference variable counter 3 shown in FIG. 1). Specifically, the count of the counter 1, which counts the feedback pulses supplied from the position coder 63 and indicative of the spindle position or counts the time-based reference pulses, is multiplied by the set override value, and the product obtained is added to the reference position Lcur stored in a register, thereby updating the reference position Lcur (Step S1). Where the spindle position is used as the reference position, the feedback pulses generated by the position coder 63 and indicative of the spindle position are already multiplied by the override value, and in this case, the override value is set to "1". The reference position may alternatively be obtained based on the command pulses for the spindle.

Subsequently, based on the reference position Lcur and the X- and Z-axis path tables Tx and Tz, command motion amounts ΔXINT and ΔZINT for the present processing period are obtained (Step S2). A method of deriving the command motion amounts ΔXINT and ΔZINT is disclosed in Unexamined Japanese Patent Publication No. 2003-303005 and is also known in the art, and therefore, detailed description thereof is omitted.

Then, tool-compensation preliminary processing based on the tool compensation table Tt (Step S3) and path-table tool-compensation processing (Step S4) are performed to obtain tool compensation motion amounts ΔXOFS and ΔZOFS.

The command motion amounts ΔXINT and ΔZINT are respectively added to the tool compensation motion amounts ΔXOFS and ΔZOFS, and the sums obtained are outputted to the respective axis control circuits 30 and 31 (Step S5), whereupon the processing for the present processing period ends. The processing shown in FIG. 6 is thereafter repeatedly executed at every predetermined period.

FIG. 7 is a flowchart illustrating details of the tool-compensation preliminary processing executed in Step S3 in FIG. 6.

First, it is determined whether or not a path-table tool compensation flag is "ON" (Step S31). The path-table tool compensation flag is set "OFF" by initialization at the start of power supply. Also, the path-table tool compensation flag is set "OFF" when the path table operation is to be terminated, that is, when a path table operation terminate command is read in during the path table interpolation process executed in Step S2 in FIG. 6. Accordingly, when the processing is executed for the first time, the path-table tool compensation flag is "OFF" and thus the procedure proceeds to Step S32, wherein the head data of the tool compensation table Tt is read out, and X- and Z-axis compensation amounts XOFScmd (=XOFS1) and ZOFScmd (=ZOFS1) corresponding to the tool compensation number Tcmd (=T1) specified by the head data of the tool compensation table Tt are read out and stored in a register as current X- and Z-axis compensation amounts XOFScur and ZOFScur. Then, the path-table tool compensation flag is set "ON" (Step S32).

It is then determined whether or not at least one of X- and Z-axis path table/tool compensation ready flags is "ON" (Step S33). At first, both flags are "OFF", and therefore, the procedure proceeds to Step S34, wherein the current X- and Z-axis compensation amounts XOFScur and ZOFScur, obtained (at first) in Step S32, are stored in the register as previous X- and Z-axis command compensation amounts XOFSold and ZOFSold.

Subsequently, a command reference position Lcmd (=L1) close to and at the same time greater than the current reference position Lcur, and a tool compensation number Tcmd (=T2) and property information Mcmd (=0) stored in association with the command reference position Lcmd (=L1) are read from the tool compensation table Tt. Also, X- and Z-axis compensation amounts XOFScmd (=XOFS2) and ZOFScmd (=ZOFS2) corresponding to the tool compensation number Tcmd (=T2) are read from the compensation amount table TOFS. Where the spindle position is used as the reference position Lcur, the spindle is moved in one direction (in which the reference position is incremented) during the path table operation.

The difference XOFSdef between the X-axis compensation amount XOFScmd and the previous command compensation amount XOFSold as well as the difference ZOFSdef between the Z-axis compensation amount ZOFScmd and the previous command compensation amount ZOFSold are obtained. Further, the obtained compensation differences XOFSdef and ZOFSdef are divided by set compensation velocities XOFSvel and ZOFSvel, respectively, to derive compensation intervals (time periods from the start to the end of compensation) XLdef and ZLdef (Step S35).

XOFSdef=XOFScmd−XOFSold

ZOFSdef=ZOFScmd−ZOFSold

XLdef=XOFSdef/XOFSvel

ZLdef=ZOFSdef/ZOFSvel

The property information Mcmd read in Step S35 is checked (Step S36), and if the property information Mcmd is "0", the command reference position Lcmd read in Step S35 is set as compensation start positions XLsta and ZLsta (Step S37). On the other hand, if the property information Mcmd is "1", the compensation intervals XLdef and ZLdef, obtained in Step S35, are individually subtracted from the command reference position Lcmd, and the differences obtained are set as the compensation start positions XLsta (=Lcmd−XLdef) and ZLsta (=Lcmd−ZLdef) (Step S38). At first, the property information Mcmd=0 and Lcmd=L1, and therefore, L1 is set as the compensation start positions XLsta and ZLsta.

Then, the X- and Z-axis path table/tool compensation ready flags XOFSrdy and ZOFSrdy are set to "1" (Step S39), whereupon the tool compensation table read process for the present processing period ends and the procedure proceeds to Step S4.

FIG. 8 illustrates the path-table tool-compensation processing to be executed in Step S4, wherein the processing for the X axis alone is shown. An identical process is executed also with respect to the Z axis. The processing for the Z axis is identical with the processing shown in FIG. 8 except that the X axis-related values are replaced by the corresponding Z axis-related values; therefore, the following description is directed only to the X-axis process.

First, the current compensation amount XOFScur (which is obtained at first in Step S32 and thereafter in Steps S44, S46 and S48) is stored in the register as the previous compensation amount XOFSbef (Step S41). Then, it is determined whether or not the X-axis path table/tool compensation ready flag XOFSrdy is "ON" ("1") (Step S42). If the flag XOFSrdy is not set "ON", the procedure proceeds to Step S49 in which the previous compensation amount XOFSbef is subtracted from the current compensation amount XOFScur to obtain a tool compensation motion amount ΔXOFS for the present processing period. At this stage, however, XOFSbef=XOFScur because of the execution of Step S41; therefore, the tool compensation motion amount ΔXOFS is set to "0", whereupon the path table/tool compensation process for the present processing period ends. On the other hand, if the X-axis path table/tool compensation ready flag XOFSrdy has been set "ON" ("1") in Step S39 of the processing shown in FIG. 7, the procedure proceeds from Step S42 to Step S43 in which it is determined whether or not the current reference position Lcur obtained in Step S1 has reached the compensation start position XLsta obtained in Step S37 or S38. If the compensation start position is not reached, the procedure proceeds to Step S49. In Step. S49, the tool compensation motion amount ΔXOFS for the present processing period is set to "0" because XOFSbef=XOFScur as in the aforementioned case, whereupon the tool compensation process for the present processing period ends.

Namely, when the path table operation has just been started, the tool compensation is already performed as shown in FIG. 4. Consequently, at the initial stage, the tool compensation amount XOFS1 remains unchanged as shown in FIG. 4, and "0" is outputted as the tool compensation motion amount ΔXOFS. Steps S1, S2, S3 (S31 and S33) and S4 (S41, S42, S43 and S49) are thereafter repeatedly executed at every predetermined periods, and if it is judged in Step S43 that the reference position Lcur read in Step S1 has reached the compensation start position XLsta obtained in Step S37 or S38, the procedure proceeds to Step S44 in which the tool compensation amount XOFScur is obtained according to the following equation (1):

$$XOFScur = XOFSdefx((Lcur-XLsta)/XLdef) + XOFSold \quad (1)$$

Subsequently, it is determined whether or not an allowable amount of travel allowable for one processing period is exceeded if the obtained tool compensation amount XOFScur is applied (Step S45). Specifically, the difference (tool compensation amount of the present processing period) obtained by subtracting the previous compensation amount XOFSbef from the tool compensation amount XOFScur obtained in Step S44 is added to the command motion amount ΔXINT for the path table operation, obtained in Step S2, and it is determined whether or not the sum obtained is greater than the allowable value XCLPvel (Step S45). If the allowable value is not exceeded, the procedure proceeds to Step S47; if the allowable value is exceeded, the tool compensation amount XOFScur is set so that the allowable value XCLPvel may not be exceeded (Step S46), and the procedure proceeds to Step S47.

$$XOFScur = XCLPvel - \Delta XINT + XOFSbef \quad (2)$$

In Step S47, it is determined whether or not the tool compensation amount XOFScur obtained in Step S44 or S46 has reached (is greater than) the command compensation amount XOFScmd read in Step S35. If the command compensation amount is not reached, the procedure proceeds to Step S49 explained above. Steps S1, S2, S3 (S31 and S33), S4 (S41, S42 through S47 and S49) and S5 are thereafter repeatedly executed at every predetermined period until the compensation is completed.

When the command reference position Lcmd is at the position L1 shown in FIG. 4, with respect to which "0" is set as the property information as seen from the table Tt the next command reference position Lcmd (=L1) read in Step S35 is set as the compensation start position XLsta in Step S37. Consequently, the tool compensation is started from the position L1, as shown in FIG. 4, and the compensation is performed in the individual processing periods until the compensation amount XOFScur reaches the X-axis compensation amount XOFScmd (=XOFS2) of the tool compensation number T2 stored in association with the position Lcmd (=L) read in Step S35. If the tool compensation amount XOFScur reaches XOFScmd (=XOFS2), XOFScmd (=XOFS2) is set as the current tool compensation amount XOFScur and the path table/tool compensation ready flag XOFSrdy is set "OFF" ("0") (Step S48), whereupon the procedure proceeds to Step S49.

Thus, the path table/tool compensation ready flag XOFSrdy is set "OFF" ("0"), and in the subsequent processing periods, Steps S1, S2, S3 (S31 and S33) and S4 (S41 and S42) are executed in order. Since the path table/tool compensation ready flag XOFSrdy is "OFF" ("0"), the procedure proceeds from Step S42 to Step S49 in which the tool compensation motion amount ΔXOFS is obtained. In this case, however, since XOFSbef=XOFScur because of the execution of Step S41, the tool compensation motion amount ΔXOFS is "0" and no tool compensation is performed.

A similar process is performed also with respect to the Z axis. Specifically, if the path table/tool compensation ready flag ZOFSrdy is set "OFF" ("0"), in the subsequent processing period the procedure proceeds from Step S33 (S3) to Step S34, so that Steps S34 through S39 explained above are executed. In Step S35, the reference position Lcmd (=L2), the tool compensation number Tcmd (=T3), the tool compensation amounts XOFS3 and ZOFS3 associated with the tool compensation number Tcmd (=T3) and the property information Mcmd (=1) are read from the table Tt. In this case, since "1" is set as the property information Mcmd, Step S38 is executed, wherein positions preceding the command reference position Lcmd (=L2) by the compensation intervals XLdef and ZLdef, obtained in Step S35, are set as the compensation start positions XLsta and ZLsta.

If it is judged thereafter in Step S43 that the compensation start position XLsta is reached, interpolation for the tool compensation is performed in Steps S44 to S47 explained above. Namely, the tool compensation is started before the reference position Lcur reaches the command reference position Lcmd (=L2), as shown in FIG. 4, so that the command tool compensation amount XOFScmd (=XOFS3) may be reached at the time the command reference position Lcmd (=L2) is reached.

The aforementioned process is thereafter repeatedly executed at every predetermined period until the path table operation ends.

In the first embodiment described above, the tool compensation start position is determined by using the property information so that the compensation may be completed or started at the command reference position Lcmd. A second embodiment explained below uses a tool compensation table Tt' whereby the compensation interval is also specified by the reference position.

Figure 9:
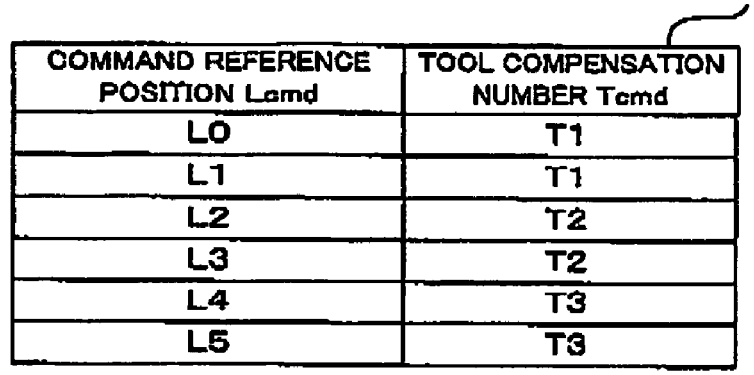
FIG. 9 illustrates an example of a tool compensation table according to the second embodiment of the present invention.
Figure 10:
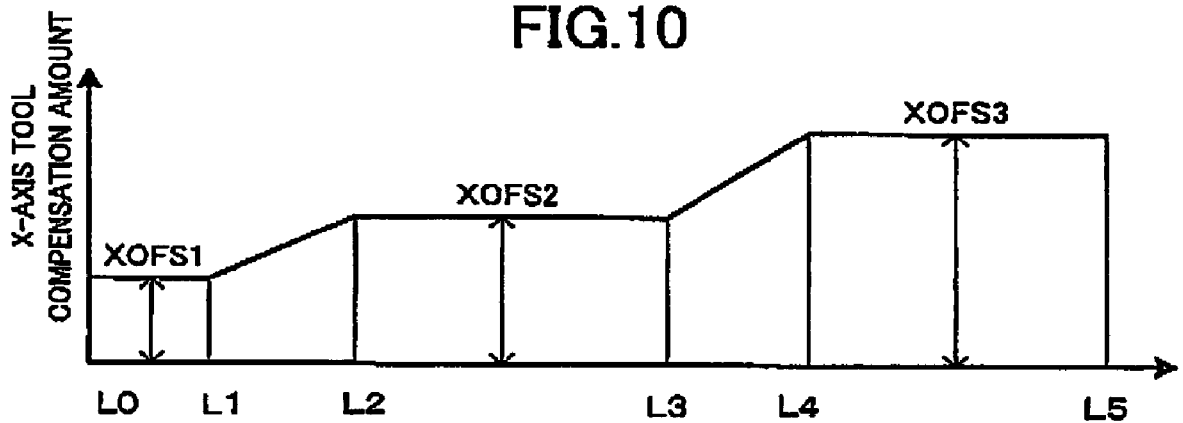
FIG. 10 illustrates X-axis movement according to tool compensation of the second embodiment.

The hardware configuration of the numerical controller used in the second embodiment is identical with that shown in FIG. 5, and the tool compensation table Tt' shown in FIG. 9 is used in the second embodiment. In the tool compensation table Tt', the tool compensation number T1 is set with respect to the reference positions L0 and L1, and the X-axis compensation amount XOFS1 obtained from the compensation amount table TOFS of FIG. 3 based on the tool compensation number T1 is used in the manner shown in FIG. 10. FIG. 10 illustrates the manner of how the X-axis compensation amount changes. Change of the Z-axis compensation amount is not illustrated in the figure.

As the command reference position changes from L1 to L2, the tool compensation number changes from T1 to T2 and the X-axis compensation amount is gradually varied from XOFS1 to XOFS2. During the interval between the command reference positions L2 and L3, the compensation amount is fixed at XOFS2. As the command reference position changes from L3 to L4, the tool compensation number changes from T2 to T3 and the X-axis compensation amount is gradually varied from XOFS2 to XOFS3. During the interval between the command reference positions L4 and L5 in which the tool compensation number T3 remains the same, the compensation amount is fixed at XOFS3.

In this manner, all of the points where the tool compensation amount is to be changed according to the tool compensation table Tt' are specified by the command reference position Lcmd.

Figure 11:
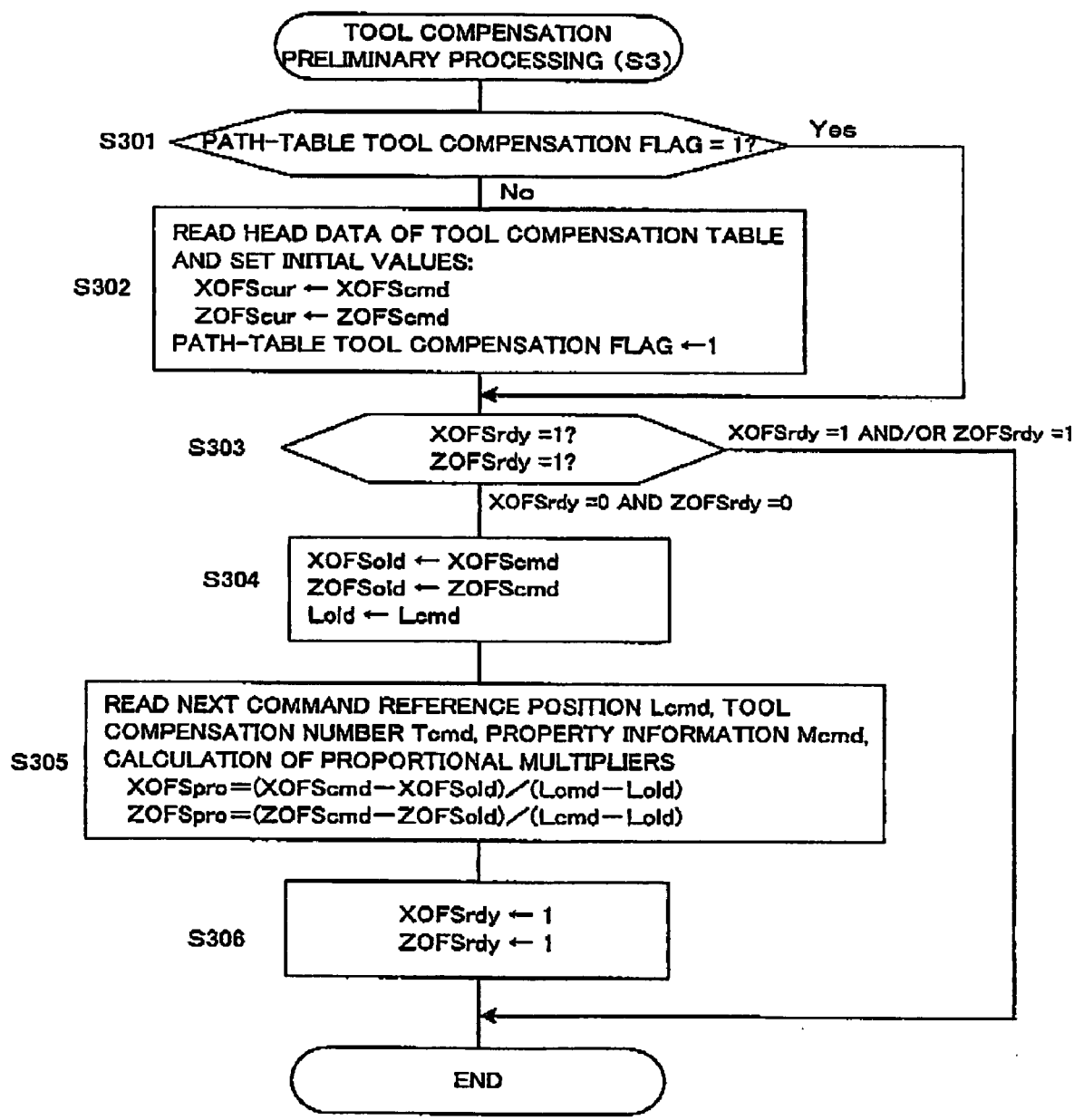
FIG. 11 is a flowchart illustrating a tool compensation table read process according to the second embodiment of the present invention.
Figure 12:
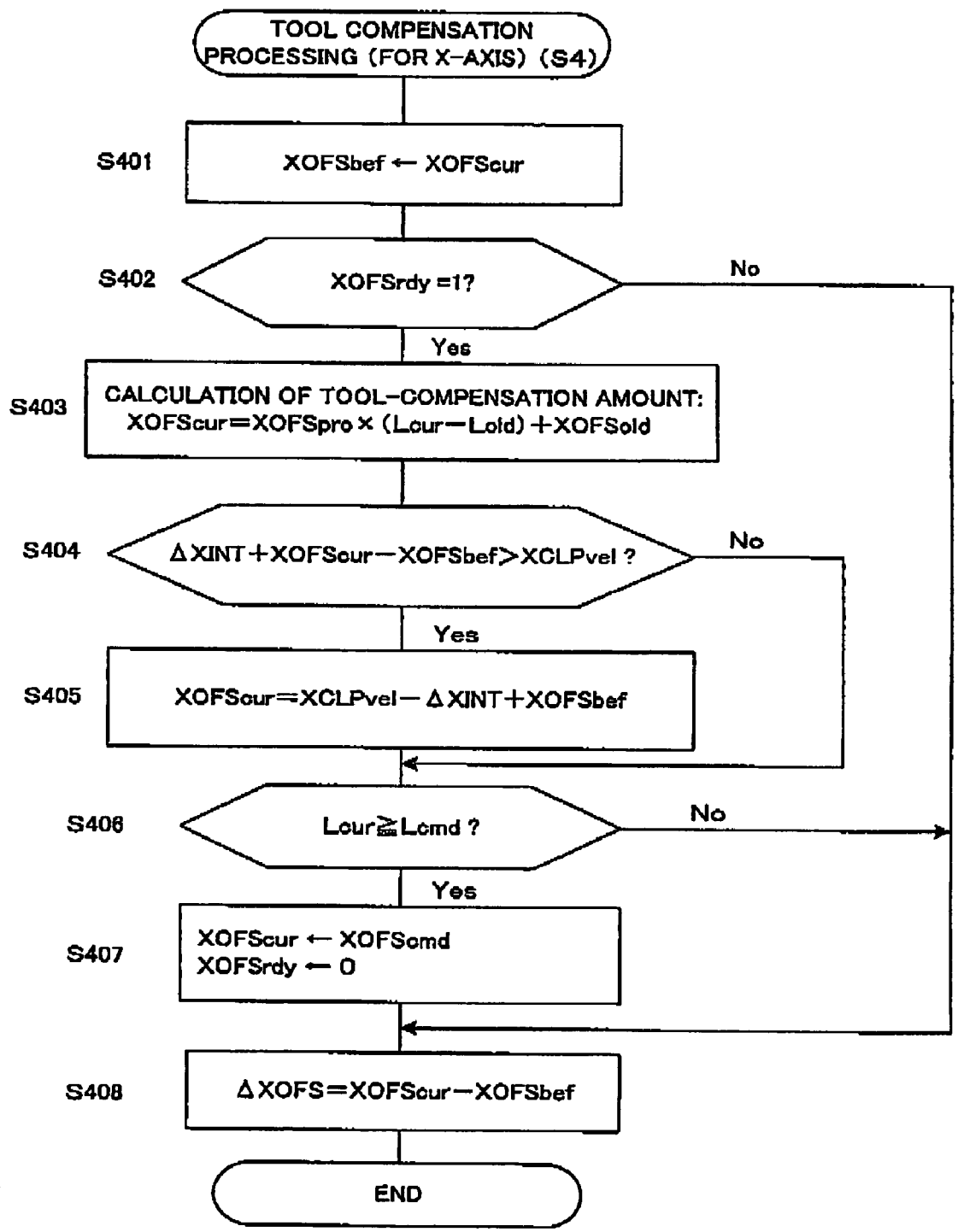
FIG. 12 is a flowchart illustrating a tool compensation process according to the second embodiment of the present invention.
Figure 16:
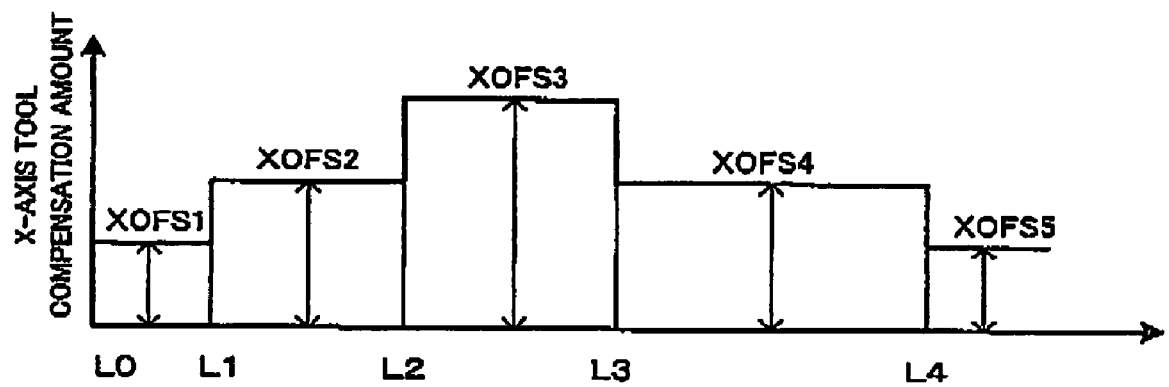
FIG. 16 illustrates tool compensation according to the conventional table data-based operation.

FIGS. 11 and 12 are flowcharts respectively illustrating a tool compensation table read process and a tool compensation process (for the X axis) according to the second embodiment. The overall process for the path table operation executed in the second embodiment is identical with that shown in FIG. 6, and the second embodiment differs from the first embodiment only in that Steps S3 and S4 in FIG. 6 are replaced by the processing shown in FIGS. 11 and 12, respectively.

After the aforementioned Steps S1 and S2 are executed, the tool-compensation preliminary processing shown in FIG. 11 is performed as Step S3. First, it is determined whether or not the path-table tool compensation flag is "ON" (Step S301). As mentioned above, the path-table tool compensation flag is set "OFF" by initialization at the start of power supply, and therefore, the procedure proceeds to Step S302, wherein the head data of the tool compensation table Tt' is read to extract the command reference position Lcmd (=L0) and the tool compensation number Tcmd (=T1) set in association therewith, and the X- and Z-axis compensation amounts XOFScmd (=XOFS1) and ZOFScmd (=ZOFS1) corresponding to the tool compensation number Tcmd (=T1) are read from the compensation amount table TOFS and stored in the register as the current X- and Z-axis compensation amounts XOFScur and ZOFScur. Then, the path-table tool compensation flag is set "ON" (Step S302).

Subsequently, it is determined whether or not at least one of the X- and Z-axis path table/tool compensation ready flags is "ON" (Step S303). At first, both flags are "OFF", and therefore, the procedure proceeds to Step S304, wherein the previous command reference position Lcmd (=L0) and the tool compensation number Tcmd (=T1) set in association therewith are read out, the X- and Z-axis compensation amounts XOFScmd (=XOFS1) and ZOFScmd (=ZOFS1) corresponding to the tool compensation number Tcmd (=T1) are read from the compensation amount table TOFS, and the thus-read XOFScmd, ZOFScmd and Lcmd are stored, respectively, as the previous X-axis command compensation amount XOFSold, the previous Z-axis command compensation amount ZOFSold and the previous command reference position Lold.

Then, the command reference position Lcmd (=L1) close to and at the same time greater than the current reference position Lcur and the tool compensation number Tcmd (=T1) corresponding to the command reference position Lcmd are read from the tool compensation table Tt'. Also, the X- and Z-axis compensation amounts XOFScmd (=XOFS1) and ZOFScmd (=ZOFS1) corresponding to the tool compensation number Tcmd are read from the compensation amount table TOFS.

The difference between the read X-axis compensation amount XOFScmd (=XOFS1) and the previous X-axis command compensation amount XOFSold (=XOFS1) and the difference between the read Z-axis compensation amount ZOFScmd (=ZOFS1) and the previous Z-axis command compensation amount ZOFSold (=ZOFS1) are each divided by the difference between the previous command reference position Lcmd (=L0) and the current command reference position L1, to obtain X- and Z-axis proportional multipliers XOFSpro and ZOFSpro (Step S305). At first, the previous and current compensation amounts are equal to each other, and therefore, the proportional multipliers XOFSpro and ZOFSpro are both "0".

Subsequently, the X- and Z-axis path table/tool compensation ready flags XOFSrdy and ZOFSrdy are set to "1" (Step S306). This completes the tool compensation table read process for the present processing period, and the procedure then proceeds to Step S4.

The path-table tool-compensation processing for the X axis, executed in Step S4, is illustrated in FIG. 12. First, the current compensation amount XOFScur is stored in the register for storing the compensation amount XOFSbef of the previous processing period (Step S401), and it is then determined whether or not the X-axis path table/tool compensation ready flag XOFSrdy is set "ON" ("1") (Step S402). If the flag XOFSrdy is not set "ON", the procedure proceeds to Step S408 in which the previous compensation amount XOFSbef is subtracted from the current compensation amount XOFScur to obtain a tool compensation motion amount $\Delta$XOFS for the present processing period. At the initial stage, however, XOFSbef=XOFScur because of the execution of Step S401, and accordingly, the tool compensation motion amount $\Delta$XOFS is set to "0", whereupon the path table/tool compensation process for the present processing period ends.

On the other hand, if the X-axis path table/tool compensation ready flag XOFSrdy has been set "ON" ("1") in Step S306 in FIG. 11, the procedure proceeds from Step S402 to Step S403 in which the tool compensation amount XOFScur is obtained according to the following equation (3):

$$XOFScur = XOFSpro \times (Lcur - Lold) + XOFSold \qquad (3)$$

Specifically, the previous command reference position Lold set in Step S304 is subtracted from the current reference position Lcur obtained in Step S1, then the difference obtained is multiplied by the proportional multiplier XOFSpro obtained in Step S305, and the product obtained is added to the previous compensation amount XOFSold obtained in Step S304, to derive the tool compensation amount XOFScur. At first, however, the proportional multiplier XOFSpro is "0", and therefore, the derived tool compensation amount remains the same as the previous one, namely, XOFScur=XOFSold=XOFS1. Consequently, the X-axis compensation amount remains unchanged and XOFS1 is maintained, as shown in FIG. 10.

Subsequently, Steps S404 and S405 respectively identical with Steps S45 and S46 of the aforementioned first embodiment are executed. Specifically, it is determined whether or not the tool motion amount becomes greater than the allowable value XCLPvel if the tool compensation amount is applied, and if it is judged that the allowable value will be exceeded, the tool compensation amount XOFScur is set so that the allowable value XCLPvel may not be exceeded, whereupon the procedure proceeds to Step S406.

In Step S406, it is determined whether or not the current reference position Lcur obtained in Step S1 has reached the command reference position Lcmd (=L1) as a compensation switching point, obtained in Step S305. If the command reference position is not reached, the procedure proceeds to Step S408. At this point of time (the reference position Lcur is between L0 and L1), however, the XOFScur=XOFSold=XOFS1, and therefore, the tool compensation motion amount $\Delta$XOFS is "0".

Steps S1, S2, S3 (S301 and S303), S4 (S401, S402, S403 through S406 and S408) and S5 are thereafter repeatedly executed at every predetermined period, and if it is judged in Step S406 that the current reference position Lcur has reached a compensation switching point, that is, the command reference position Lcmd (=L1) obtained in Step S305, the command compensation amount XOFScmd (=XOFS1)

is set as the current tool compensation amount XOFScur and the path table/tool compensation ready flag XOFSrdy is set "OFF" ("0") (Step S407), whereupon the procedure proceeds to Step S408.

In the subsequent processing period, the procedure proceeds from Step S303 to Step S304, wherein the previous tool compensation number Tcmd (=T1) is read out, and the X- and Z-axis compensation amounts XOFScmd (=XOFS1) and ZOFScmd (=ZOFS1) corresponding to the tool compensation number Tcmd (=T1) are read from the compensation amount table TOFS and stored as the previous command compensation amounts XOFSold and ZOFSold, respectively. Also, the previous command reference position Lcmd (=L1) is read out and stored as the previous reference position Lold (=L1).

Subsequently, the command reference position Lcmd (=L2) close to and at the same time greater than the current reference position Lcur and the tool compensation number Tcmd (=T2) associated with the command reference position Lcmd (=L2) are read from the tool compensation table Tt'. Also, the X- and Z-axis compensation amounts XOFScmd (=XOFS2) and ZOFScmd (=ZOFS2) corresponding to the tool compensation number Tcmd (=T2) are read from the compensation amount table TOFS.

The difference between the read X-axis compensation amount XOFScmd (=XOFS2) and the previous X-axis command compensation amount XOFSold (=XOFS1) and the difference between the read Z-axis compensation amount ZOFScmd (=ZOFS2) and the previous Z-axis command compensation amount ZOFSold (=ZOFS1) are each divided by the difference between the previous command reference position Lcmd (=L1) and the current command reference position L2, to obtain the X- and Z-axis proportional multipliers XOFSpro and ZOFSpro (Step S305).

Subsequently, the X- and Z-axis path table/tool compensation ready flags XOFSrdy and ZOFSrdy are set to "1" (Step S306). This completes the tool compensation table read process for the present processing period, and the procedure then proceeds to Step S4.

In Step S4 shown in FIG. 12, the procedure proceeds from Step S402 to Step S403, in which the tool compensation amount XOFScur is calculated using the proportional multiplier XOFSpro obtained in Step S305, the current and previous reference positions Lcur and Lold, and the previous compensation amount XOFSold. It is then determined whether or not the allowable value is exceeded if the calculated tool compensation amount is applied (Step S404), and if it is judged that the allowable value is exceeded, the compensation amount is adjusted so that the allowable value may not be exceeded (Step S405). Subsequently, it is determined whether or not the current reference position Lcur has reached the next command reference position Lcmd (=L2) read in Step S305, and if the next command reference position is not reached, the procedure proceeds to Step S408.

As a result, during the interval between the reference positions L1 and L2 shown in FIG. 10, the tool compensation amount gradually varies (in the example of FIG. 10, gradually increases).

If the current reference position Lcur reaches the next command reference position Lcmd (=L2), the command compensation amount XOFScmd (=XOFS2) is set as the current tool compensation amount XOFScur and the path table/tool compensation ready flag XOFSrdy is set "OFF" ("0") (Step S407), whereupon the procedure proceeds to Step S408.

If both of the X- and Z-axis path table/tool compensation ready flags XOFSrdy and ZOFSrdy are set "OFF" ("0"), in the subsequent processing cycle the procedure proceeds from Step S303 to Step S304. Accordingly, the register storing the previous reference position is updated, the next command reference position Lcmd (=L3) and the tool compensation number Tcmd associated therewith are read out, new proportional multipliers XOFSpro and ZOFSpro are obtained (the proportional multipliers obtained in this case are "0"), and the path table/tool compensation ready flags XOFSrdy and ZOFSrdy are set "ON" ("1") (Steps S304, S305 and S306).

In the tool compensation processing of Step S4, the procedure proceeds from Step S402 to Step S403, and Steps S401 and S402 through S406 are thereafter repeatedly executed until the current reference position Lcur reaches the next command reference position Lcmd (=L3). With respect to the reference positions L2 and L3, the same tool compensation number T2 is set and thus the compensation amount is the same; therefore, the compensation amount remains unchanged during the interval between the reference positions L2 and L3. The aforementioned process is thereafter executed at every predetermined period, though no further explanation is given here, whereby the compensation amount gently varies as shown in FIG. 10.

What is claimed is:

1. A numerical controller for controlling motors for driving axes of a machine tool according to a data table for commanding positions of the axes on the basis of time or a spindle position as a reference variable, comprising:

storage means storing tool-compensation numbers respectively set for command values of the reference variable at which tool-compensations are to be effected, and storing tool-compensation amounts respectively set for the tool compensation numbers; and interpolation means for interpolating the tool-compensation amount for each of the command values of the reference variable stored in said storage means with a set compensation velocity at every predetermined period, and outputting interpolated tool-compensation amounts to the motors.

2. A numerical controller according to claim 1, wherein said storage means stores property information about each of the command values of the reference variable at which the tool-compensation is to be started or completed.

3. A numerical controller according to claim 1, further comprising means for adjusting the tool-compensation amount such that a motion mount of each of the axes compensated by the tool-compensation amount does not exceed a set limit value.

4. A numerical controller for controlling motors for driving axes of a machine tool according to a data table for commanding positions of the axes on the basis of time or a spindle position as a reference variable, comprising:

storage means storing tool-compensation numbers respectively set for command values of the reference variable at which tool-compensations are to be effected, commanded tool-compensation amounts respectively set for the tool-compensation numbers, and a set tool-compensation velocity;

calculation means for calculating a difference between the commanded tool-compensation amount for the tool-compensation number set for a next command value of the reference variable that is closest to and greater than a present value of the reference variable and the commanded tool-compensation amount for the tool-compensation number set for the previous command value of the reference variable; and output means for outputting a tool-compensation amount to vary by the difference of the commanded tool-compensation amounts calculated by said calculation means with the set compensation velocity such that variation of the tool-compensation amount is started at the next command value of the reference variable or to be completed at the next command value of the reference variable.

5. A numerical controller according to claim 4, wherein said storage means stores property information about each of the command values of the reference variable at which the tool-compensation is to be started or completed.

6. A numerical controller according to claim 4, further comprising means for adjusting the tool-compensation amount such that a motion mount of each of the axes compensated by the tool-compensation amount does not exceed a set limit value.

7. A numerical controller for controlling motors for driving axes according to a data table for commanding positions of the axes on the basis of time or a spindle position as a reference variable, comprising:

first storage means storing tool-compensation numbers respectively set for command values of the reference variable at which tool-compensations are to be started, and tool-compensation numbers respectively set for command values of the reference variable at which the tool-compensations are to be terminated;

second storage means storing commanded tool-compensation amounts respectively set for the tool compensation numbers; and output means for outputting a tool-compensation amount to be gradually varied between adjacent ones of the commanded tool-compensation amounts while the reference variable changes from each one of the command values at which the tool-compensations are to be started to adjacent one of the command values at which the tool-compensations are to be terminated.

8. A numerical controller according to claim 7, further comprising means for adjusting the tool-compensation amount such that a motion mount of each of the axes compensated by the tool-compensation amount does not exceed a set limit value.

* * * * *

UNITED STATES PATENT AND TRADEMARK OFFICE
CERTIFICATE OF CORRECTION

| | | |
|---|---|---|
| PATENT NO. | : 7,274,165 B2 | Page 1 of 1 |
| APPLICATION NO. | : 11/410289 | |
| DATED | : September 25, 2007 | |
| INVENTOR(S) | : Yasushi Takeuchi et al. | |

It is certified that error appears in the above-identified patent and that said Letters Patent is hereby corrected as shown below:

Column 1, Line 59, change "commanded" to --commanded.--.

Column 9, Line 1, change "Step." to --Step--.

Column 9, Line 20, change "XOFS defx" to --XOFSdefx--.

Column 9, Line 51, change "Tt" to --Tt,--.

Column 12, Line 63, change "poriod," to --period,--.

Signed and Sealed this

Fifteenth Day of April, 2008

JON W. DUDAS
*Director of the United States Patent and Trademark Office*